(12) United States Patent (10) Patent No.: US 12,688,630 B2

Fukuchi et al. (45) Date of Patent: Jul. 21, 2026

(54) PRINTED MATTER PRODUCTION SYSTEM AND NON-TRANSITORY COMPUTER-READABLE STORAGE MEDIUM STORING SIGNATURE IMAGE PRODUCTION PROGRAM

(71) Applicant: SEIKO EPSON CORPORATION, Tokyo (JP)

(72) Inventors: Yuto Fukuchi, Matsumoto (JP); Yuka Kobayashi, Shiojiri (JP); Yuko Ishifuro, Shiojiri (JP); Ayako Kobayashi, Okaya (JP); Toshifumi Sakai, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 166 days.

(21) Appl. No.: 18/494,803

(22) Filed: Oct. 26, 2023

(65) Prior Publication Data

US 2024/0144563 A1 May 2, 2024

(30) Foreign Application Priority Data

Oct. 28, 2022 (JP) ................................. 2022-173125

(51) Int. Cl.
| | |
|---|---|
| *G09G 5/00* | (2006.01) |
| *G06T 11/60* | (2006.01) |
| *G06V 30/142* | (2022.01) |
| *G06V 30/32* | (2022.01) |

(52) U.S. Cl.
CPC .......... *G06T 11/60* (2013.01); *G06V 30/1423* (2022.01); *G06V 30/333* (2022.01)

(58) Field of Classification Search
CPC ................. G09G 5/14; G09G 2340/10; G09G 2340/125; G06T 11/60; G06T 15/503; G06T 2207/30196; G06T 2207/10016; G06T 7/13; G06T 7/50; G06T 2200/24; G06T 2207/10024; G06T 2207/20221; G06T 11/203; G06T 11/00; G06T 1/60; G06T 7/248; G06T 7/74; G06T 5/50; G06F 3/017; G06V 20/56; G06V 30/1423; H04N 23/69; H04N 23/60; G02B 27/001; G02B 2027/0138; G02B 2027/014; B25J 9/1689; B25J 9/1697
USPC .......................................................... 345/629
See application file for complete search history.

(56) References Cited

U.S. PATENT DOCUMENTS

| | | | |
|---|---|---|---|
| 2017/0103046 A1* | 4/2017 | Schroder | ............... G06F 40/109 |
| 2021/0027292 A1* | 1/2021 | Farivar | .................. G06F 18/24 |
| 2021/0182546 A1* | 6/2021 | Tsuji | .................. G06F 3/04883 |
| 2021/0334803 A1* | 10/2021 | Bi | ........................ G06Q 20/401 |
| 2021/0370685 A1 | 12/2021 | Endo | |

FOREIGN PATENT DOCUMENTS

| | | |
|---|---|---|
| JP | 2016-091342 A | 5/2016 |
| JP | 2021-187025 A | 12/2021 |
| JP | 2022-039737 A | 3/2022 |

* cited by examiner

*Primary Examiner* — Gordon G Liu

(74) *Attorney, Agent, or Firm* — Spencer Fane LLP

(57) ABSTRACT

A printed matter production system includes an image acquiring section that acquires an image; a signature acquiring section that acquires a handwritten signature; a synthesizing section that synthesizes the signature and the image according to a synthesis method based on at least one of the image and the signature; and a printing section that prints the image after the synthesis so as to produce a printed matter.

7 Claims, 11 Drawing Sheets

PRINTED MATTER PRODUCTION SYSTEM AND NON-TRANSITORY COMPUTER-READABLE STORAGE MEDIUM STORING SIGNATURE IMAGE PRODUCTION PROGRAM

The present application is based on, and claims priority from JP Application Serial Number 2022-173125, filed Oct. 28, 2022, the disclosure of which is hereby incorporated by reference herein in its entirety.

BACKGROUND

1. Technical Field

The present disclosure relates to a printed matter production system, a printed matter production method, a signature image production method, a non-transitory computer-readable storage medium storing a printed matter production program, and a non-transitory computer-readable storage medium storing a signature image production program.

2. Related Art

A service for processing a picture using a prepared template, a prepared stamp, or a prepared pen tool to create original goods is known. A technique for signing such original goods is also known. JP-A-2016-91342 discloses a technique for determining the validity of signature data based on signature data registered in advance in a secure print function of starting printing based on a print job when user authentication is successful.

There has been a demand for a technique capable of appropriately signing an image.

SUMMARY

In order to satisfy the above-described demand, according to an aspect of the present disclosure, a printed matter production system includes an image acquiring section that acquires an image; a signature acquiring section that acquires a handwritten signature; a synthesizing section that synthesizes the signature and the image according to a synthesis method based on at least one of the image and the signature; and a printing section that prints the image after the synthesis so as to produce a printed matter.

In addition, in order to satisfy the above-described demand, according to another aspect of the present disclosure, a printed matter production method includes: acquiring an image; acquiring a handwritten signature; and printing a synthesized image obtained by synthesizing the image and the signature according to a synthesis method based on at least one of the image and the signature so as to produce a printed matter.

Furthermore, in order to satisfy the above-described demand, according to another aspect of the present disclosure, a signature image production method includes: acquiring an image; acquiring a handwritten signature; and producing a signature image obtained by synthesizing the signature and the image according to a synthesis method based on at least one of the image and the signature.

Furthermore, in order to satisfy the above-described demand, according to another aspect of the present disclosure, a non-transitory computer-readable storage medium stores a printed matter production program for causing a computer to function as: an image acquiring section that acquires an image; a signature acquiring section that acquires a handwritten signature; a synthesizing section that synthesizes the signature and the image according to a synthesis method based on at least one of the image and the signature; and a print processing section that prints the image after the synthesis so as to produce a printed matter.

Furthermore, in order to satisfy the above-described demand, according to another aspect of the present disclosure, a non-transitory computer-readable storage medium stores a signature image production program for causing a computer to function as: an image acquiring section that acquires an image; a signature acquiring section that acquires a handwritten signature; and a synthesizing section that synthesizes the signature and the image according to a synthesis method based on at least one of the image and the signature so as to produce a signature image.

DESCRIPTION OF EMBODIMENTS

Embodiments of the present disclosure are described in the following order.

Figure 1:
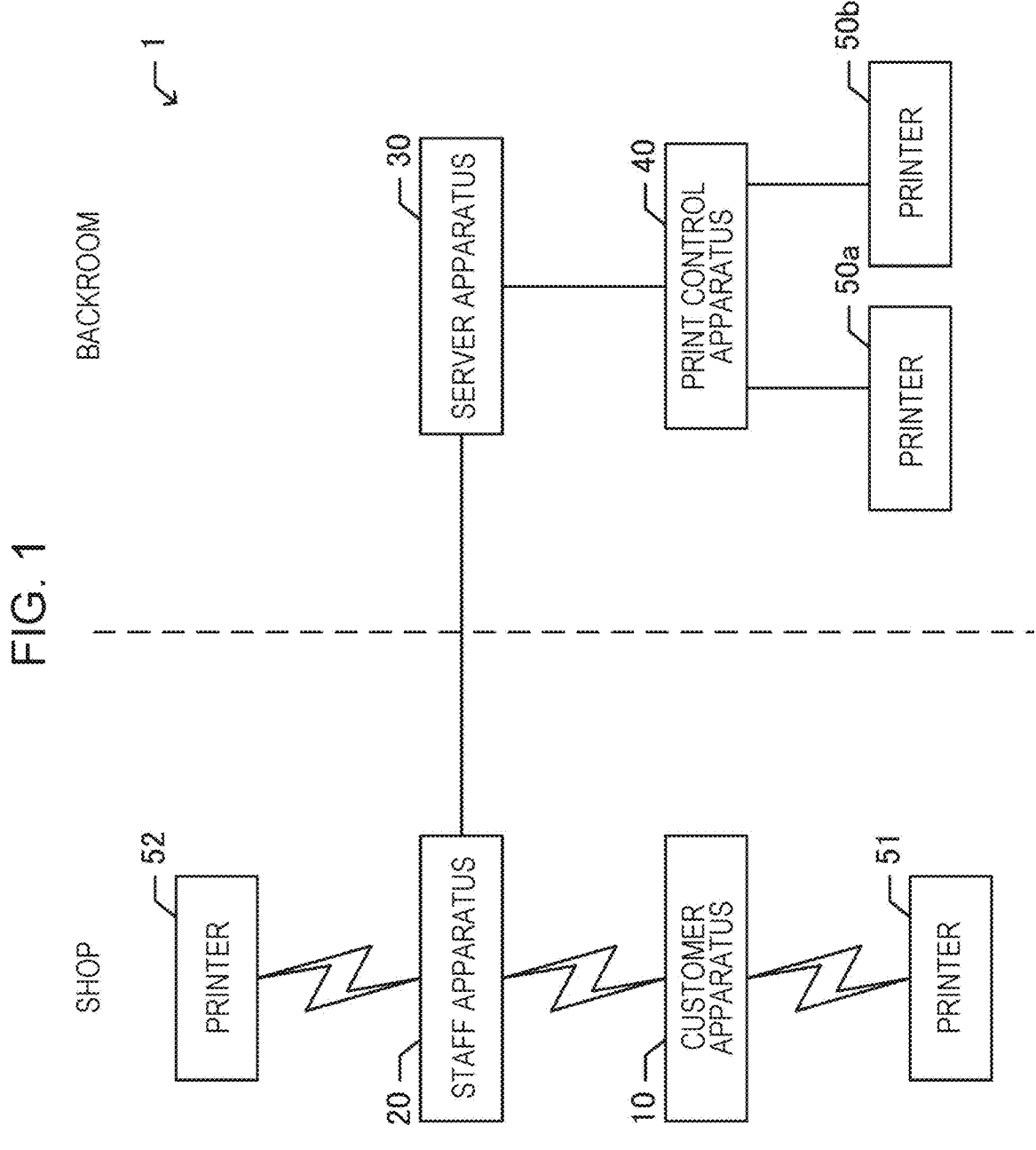
FIG. 1 is a diagram schematically illustrating an example of a printed matter production system.

(1) Configuration of Printed Matter Production System
(1-1) Configuration of Customer Apparatus
(1-2) Configuration of Staff Apparatus
(1-3) Configuration of Server Apparatus
(1-4) Configuration of Print Control Apparatus
(2) Process of Producing Printed Matter
(3) Supplementary Notes
(1) Configuration of Printed Matter Production System
FIG. 1 is a diagram schematically illustrating an example of a printed matter production system according to an embodiment. The printed matter production system 1 includes a customer apparatus 10, a staff apparatus 20, a server apparatus 30, and a print control apparatus 40. A printer 51 that can perform printing in accordance with a print instruction from the customer apparatus 10 is connected to the customer apparatus 10. A printer 52 that can perform printing in accordance with a print instruction from the staff apparatus 20 is connected to the staff apparatus 20. Printers 50a and 50b that can perform printing in accordance with a print instruction from the print control apparatus 40 are connected to the print control apparatus 40. The number of apparatuses illustrated in FIG. 1 is an example and is not limited. For example, the number of printers 50a and 50b may be three or more or may be two or less. Although FIG. 1 illustrates the single customer apparatus 10, the single staff apparatus 20, the single printer 51, the single printer 52, and the like, a plurality of customer apparatuses 10, a plurality of staff apparatuses 20, a plurality of printers 51, a plurality of printers 52, and the like may be provided in the printed matter production system 1.

The apparatuses can communicate with each other via a network. The network may be in various forms. For example, in the present embodiment, it is assumed that the customer apparatus 10 wirelessly communicates with the staff apparatus 20 and the printer 51 and that the staff apparatus 20 wirelessly communicates with the customer apparatus 10 and the printer 52 and communicates with the server apparatus 30 by wire. However, the network is not limited thereto.

In the present embodiment, the printed matter production system 1 is used to produce an original printed matter according to an order from a customer. In the present embodiment, the customer apparatus 10, the staff apparatus 20, and the printers 51 and 52 are disposed in a shop in which an order is accepted. Meanwhile, the server apparatus 30, the print control apparatus 40, and the printers 50*a* and 50*b* are disposed in a backroom different from the shop. The backroom may be a room continuous with the shop or may be a printing factory or the like separated from the shop.

Each of the customer apparatus 10 and the staff apparatus 20 is, for example, a mobile information processing apparatus such as a tablet terminal, but is not limited to a mobile apparatus. A customer uses the customer apparatus 10 disposed in the shop to place an order. Staff of the shop uses the staff apparatus 20 to confirm the order and process a payment. Print data generated according to the order is transmitted to the server apparatus 30. The print data is stored in the server apparatus 30. The server apparatus 30 manages progress and the like of printing for the print data. In the backroom, a print operator uses the print control apparatus 40 to perform printing according to the order of the customer.

The type of a printed matter produced according to the order is not limited. In the present embodiment, it is assumed that the printed matter is produced by performing printing on a three-dimensional medium (mug cap or smartphone case) and a planar medium. Therefore, as the printers 50*a* and 50*b*, equipment that can produce a three-dimensional medium and a planar medium is prepared. The printers 50*a* and 50*b* are not particularly limited and printing methods based on such three-dimensional and planar media are used in the printers 50*a* and 50*b*. For example, when a medium is a three-dimensional medium such as a mug cup, the printers 50*a* and 50*b* may include a sublimation transfer printer and press machines (for example, a mug press machine for transfer of an image to a surface of a cylindrical object such as a mug cup, a press machine for transfer of an image to a smartphone cover, and the like) for sublimation transfer of an image printed on sublimation transfer paper. In addition, when a medium is a T-shirt, an ink jet printer and a sublimation transfer printer are used as the printers 50*a* and 50*b*.

The printer 51 is, for example, a document printer that prints a receipt or the like indicating an order number or the like for identifying an order by a customer. The printer 52 is, for example, a document printer that prints, for a customer, an order form or the like indicating the content of an order.

The apparatuses forming the printed matter production system 1 described above are described below.

(1-1) Configuration of Customer Apparatus

Figure 2:
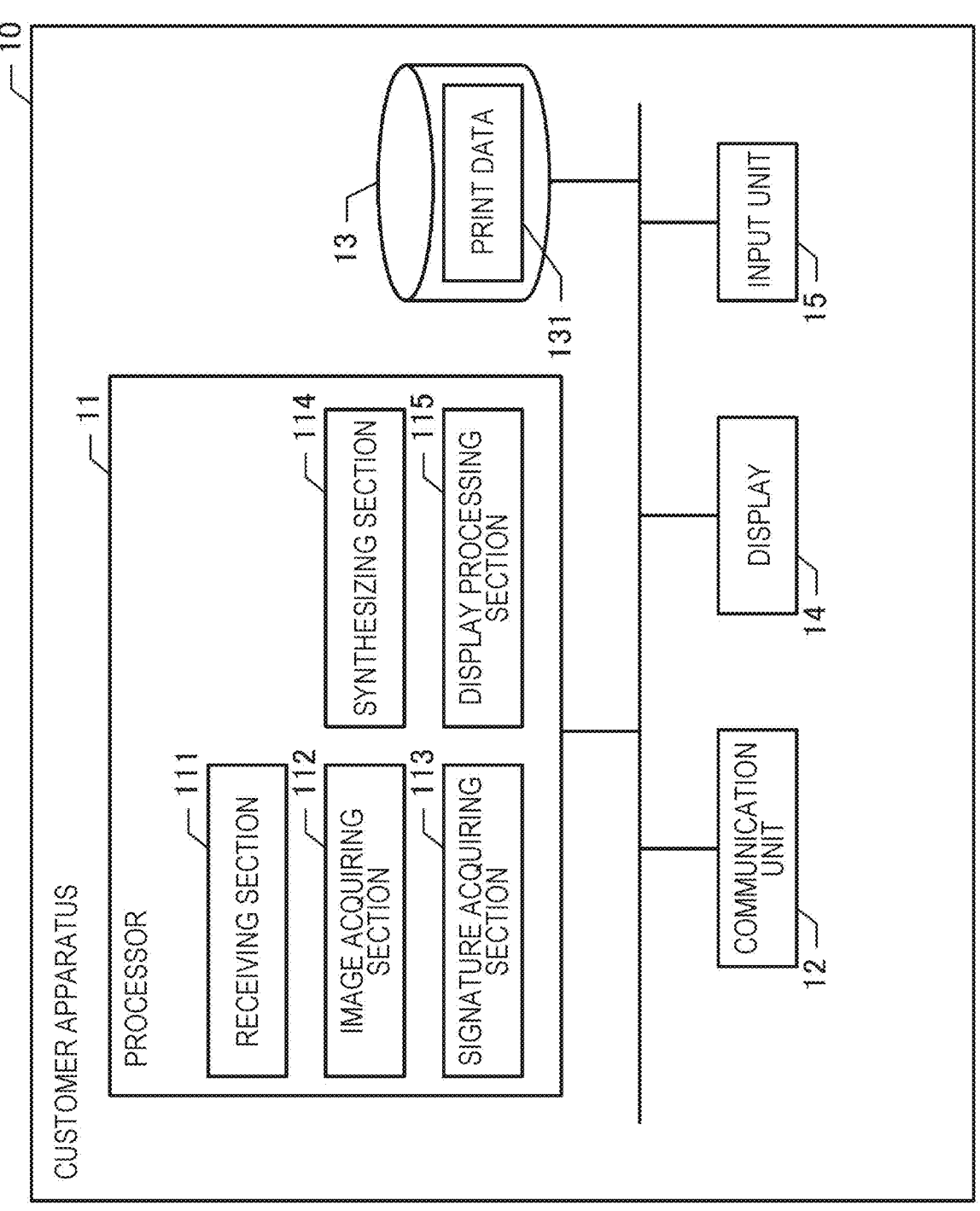
FIG. 2 is a block diagram illustrating a configuration of a customer apparatus.

FIG. 2 is a block diagram illustrating a configuration of the customer apparatus 10. The customer apparatus 10 includes a processor 11, a communication unit 12, a nonvolatile memory 13, a display 14, and an input unit 15. The processor 11 includes a CPU, a ROM, and a RAM that are not illustrated in FIG. 2. The processor 11 can execute various programs stored in the nonvolatile memory 13 to control the communication unit 12, the nonvolatile memory 13, the display 14, and the input unit 15 of the customer 10 and the printer 51.

The processor 11 may be a single chip or a plurality of chips. Alternatively, the processor 11 may be configured as an SoC together with various functional blocks. In addition, for example, an ASIC may be used instead of the CPU. Alternatively, the processor 11 may have a configuration in which the CPU and an ASIC cooperate with each other. Each of the apparatuses according to the present embodiment may include a processor. In this case, the processors can be implemented in various forms in a similar manner to the processor 11.

The communication unit 12 includes a communication interface for communicating with an external apparatus according to various communication protocols. The customer apparatus 10 can communicate with the other apparatuses via the communication unit 12. The communication unit 12 also includes an interface for communicating with various removable memories attached to the customer apparatus 10.

The display 14 is a display device that displays any image. The input unit 15 is a device on which a user performs an input operation. For example, the input unit 15 is a touch panel or the like. In the present embodiment, it is assumed that the customer apparatus 10 is a tablet terminal. Therefore, it is assumed that the input unit 15 is mainly a touch panel, but a keyboard, a mouse, or the like may be used as the input unit 15. In any of the cases, a user as a customer can operate the input unit 15 to input a user's intention to the customer apparatus 10 while viewing an image and a character displayed on the display 14.

The processor 11 functions as an accepting section 111, an image acquiring section 112, a signature acquiring section 113, a synthesizing section 114, and a display processing section 115 by executing a signature image production program. Hereinafter, processing described as processing that is executed by the accepting section 111, the image acquiring section 112, the signature acquiring section 113, the synthesizing section 114, and the display processing section 115 is processing that is executed by the processor 11.

The customer operates the input unit 15 while viewing the display 14 to specify an image and a handwritten signature to be formed on a medium and specify sizes and positions of the image and the signature in order to place an order. The accepting section 111 receives the order for a printed matter. The image acquiring section 112 acquires the image to be printed on the medium from an external apparatus such as a mobile terminal owned by the customer or the like via the communication unit 12, for example. The signature acquiring section 113 acquires data of the handwritten signature to be superimposed on the image from the external apparatus via the communication unit 12.

The synthesizing section 114 synthesizes the image selected by the customer and the signature selected by the customer so as to generate print data 131 for drawing the image and the signature on the medium. The print data 131 is stored in the nonvolatile memory 13 in association with an order ID and a print setting. The order ID is information identifying the order for printing. The print setting is information regarding a setting for printing the print data 131. The print setting includes information indicating at least the size and the position of the image, the size and the position of the signature, and a color of the signature.

The display processing section 115 displays, on the display 14, a preview image of the image and the signature to be drawn on the medium. Therefore, the user as the customer can imagine a completed printed matter. Details of this processing will be described later. When the order placed by the customer is confirmed, the print data 131 is transmitted to the staff apparatus 20, and the staff apparatus 20 processes a payment.

(1-2) Configuration of Staff Apparatus

Figure 3:
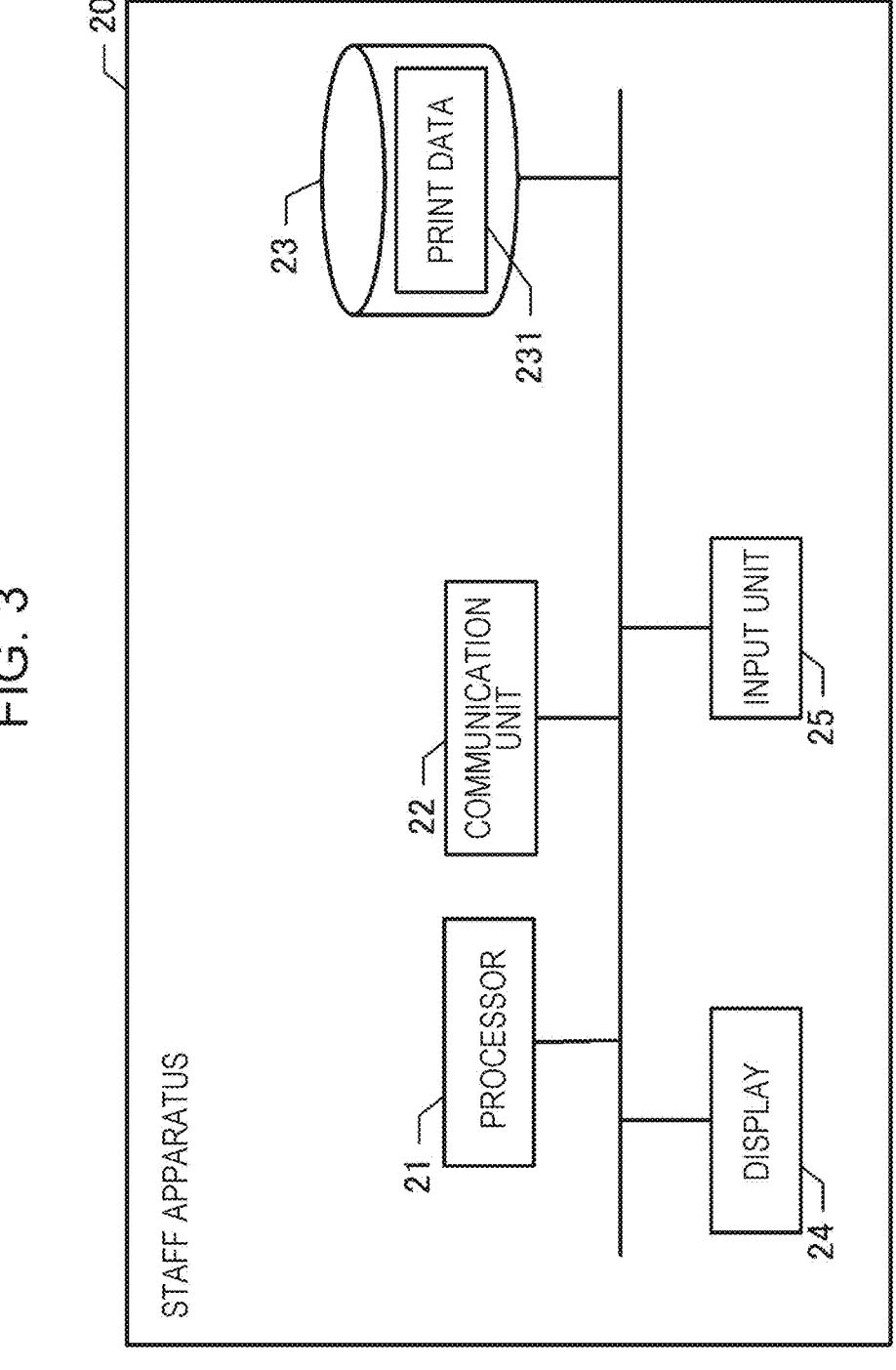
FIG. 3 is a block diagram illustrating a configuration of a staff apparatus.

FIG. 3 is a block diagram illustrating a configuration of the staff apparatus 20. The staff apparatus 20 includes a processor 21, a communication unit 22, a nonvolatile memory 23, a display 24, and an input unit 25. The processor 21 includes a CPU, a ROM, and a RAM that are not illustrated in FIG. 3. The processor 21 can execute various programs stored in the nonvolatile memory 23 to control the communication unit 22, the nonvolatile memory 23, the display 24, and the input unit 25 of the staff apparatus 20 and the printer 52. In the nonvolatile memory 23, print data 231 is stored. The print data 231 is transmitted from the customer apparatus 10. That is, the print data 231 is the same as the print data 131 and is associated with the order ID and the print setting.

The communication unit 22 includes a communication interface for communicating with an external apparatus according to various communication protocols. The staff apparatus 20 can communicate with the other apparatuses via the communication unit 22. The communication unit 22 also includes an interface for communicating with various removable memories attached to the staff apparatus 20.

The display 24 is a display device that displays any image. The input unit 25 is a device on which a user performs an input operation. For example, the input unit 25 is a touch panel or the like. In the present embodiment, it is assumed that the staff apparatus 20 is a tablet terminal. Therefore, it is assumed that the input unit 25 is mainly a touch panel, but a keyboard, a mouse, a numeric keypad, or the like may be used as the input unit 25. In any of the cases, a user as staff of the shop can operate the input unit 25 to input a user's intention to the staff apparatus 20 while viewing an image and a character displayed on the display 24.

The staff apparatus 20 is connected to a point-of-sales (POS) system not illustrated. The processor 21 can perform processing of accepting an order and processing a payment. When an order is confirmed, the processor 21 causes the POS system to process a payment. In addition, the processor 21 causes the printer 52 to print an order form indicating the content of an ordered printed matter. In addition, the processor 21 transmits the print data 231 stored in the nonvolatile memory 23 to the server apparatus 30.

(1-3) Configuration of Server Apparatus

Figure 4:
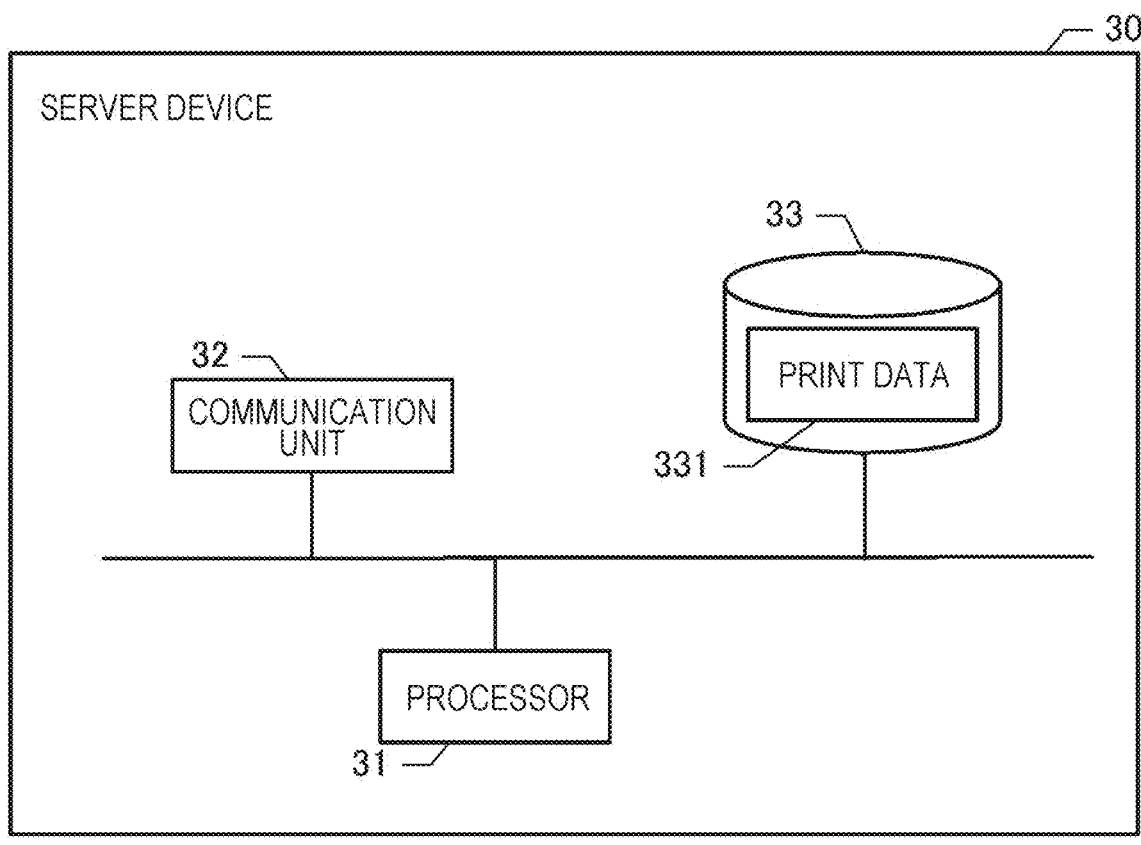
FIG. 4 is a block diagram illustrating a configuration of a server apparatus.

FIG. 4 is a block diagram illustrating a configuration of the server apparatus 30. The server apparatus 30 includes a processor 31, a communication unit 32, and a nonvolatile memory 33. The processor 31 includes a CPU, a ROM, and a RAM that are not illustrated in FIG. 4. The processor 31 can execute various programs stored in the nonvolatile memory 33 to control the communication unit 32 and the nonvolatile memory 33 of the server apparatus 30 and the apparatuses connected to the network.

The communication unit 32 includes a communication interface for communicating with an external apparatus according to various wired or wireless communication protocols. The server apparatus 30 can communicate with the other apparatuses via the communication unit 32. The communication unit 32 may include an interface for communicating with various removable memories attached to the server apparatus 30.

In the nonvolatile memory 33 of the server apparatus 30, various information is accumulated. In the nonvolatile memory 33, for example, print data 331 is stored in association with the order ID and the print setting. The print data 331 is transmitted from the staff apparatus 20.

(1-4) Configuration of Print Control Apparatus

Figure 5:
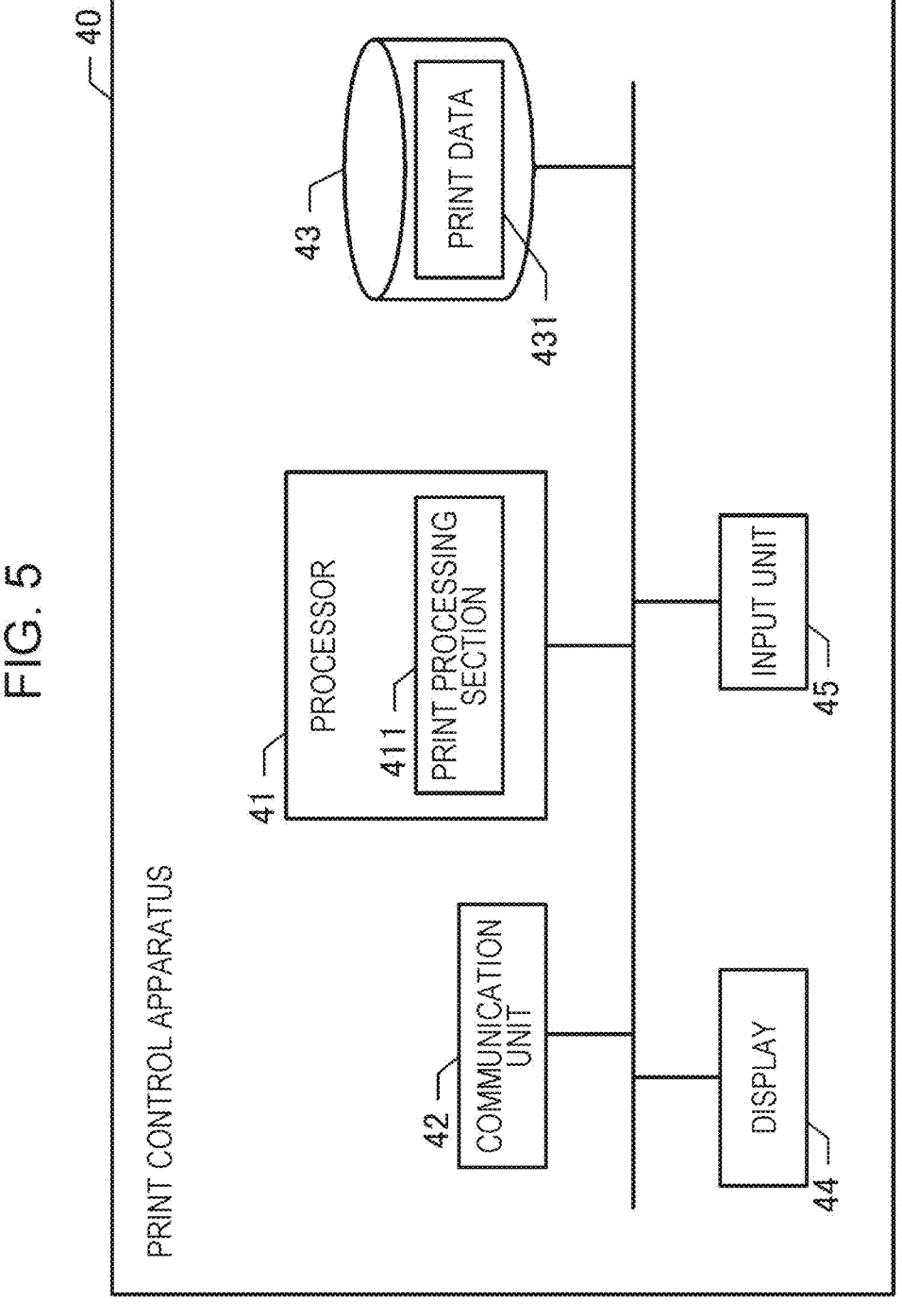
FIG. 5 is a block diagram illustrating a configuration of a print control apparatus.

FIG. 5 is a diagram illustrating a configuration of the print control apparatus 40. The print control apparatus 40 includes a processor 41, a communication unit 42, a nonvolatile memory 43, a display 44, and an input unit 45. The processor 41 includes a CPU, a ROM, and a RAM that are not illustrated in FIG. 5. The processor 41 can execute various programs stored in the nonvolatile memory 43 to control the communication unit 42, the nonvolatile memory 43, the display 44, and the input unit 45 of the print control apparatus 40 and the printers 50*a* and 50*b*. In the nonvolatile memory 43, print data 431 is stored in association with the order ID and the print setting. The print data 431 is transmitted from the server apparatus 30.

The communication unit 42 includes a communication interface for communicating with an external apparatus according to various communication protocols. The print control apparatus 40 can communicate with the other apparatuses via the communication unit 42. The communication unit 42 also includes an interface for communicating with various removable memories attached to the print control apparatus 40.

The display 44 is a display device that displays any image. The input unit 45 is a device on which a user performs an input operation. For example, the input unit 45 is a keyboard, a mouse, or the like. In the present embodiment, it is assumed that the print control apparatus 40 is a stationary computer. Therefore, it is assumed that the input unit 45 is mainly a keyboard or a mouse, but a touch panel or the like may be used as the input unit 45. In any of the cases, a user as a print operator can operate the input unit 45 to input a user's intention to the print control apparatus 40 while viewing an image and a character displayed on the display 44.

The processor 41 functions as a print processing section 411 by executing a program not illustrated. Hereinafter, processing described as processing that is executed by the print processing section 411 is processing that is executed by the processor 41.

The print processing section 411 draws an image and a handwritten signature on a medium such as a T-shirt based on the print setting so as to produce a printed matter. The print processing section 411 refers to the print data 431 and instructs the printer 50*a* or the printer 50*b* to perform printing based on the print setting. The printer 50*a* or the printer 50*b* instructed to perform printing prints the image indicated by the print data 431 according to the print instruction so as to produce a printed matter. Each of the printers 50*a* and 50*b* is an example of a printing section that produces a printed matter.

(2) Process of Producing Printed Matter

Figure 6:
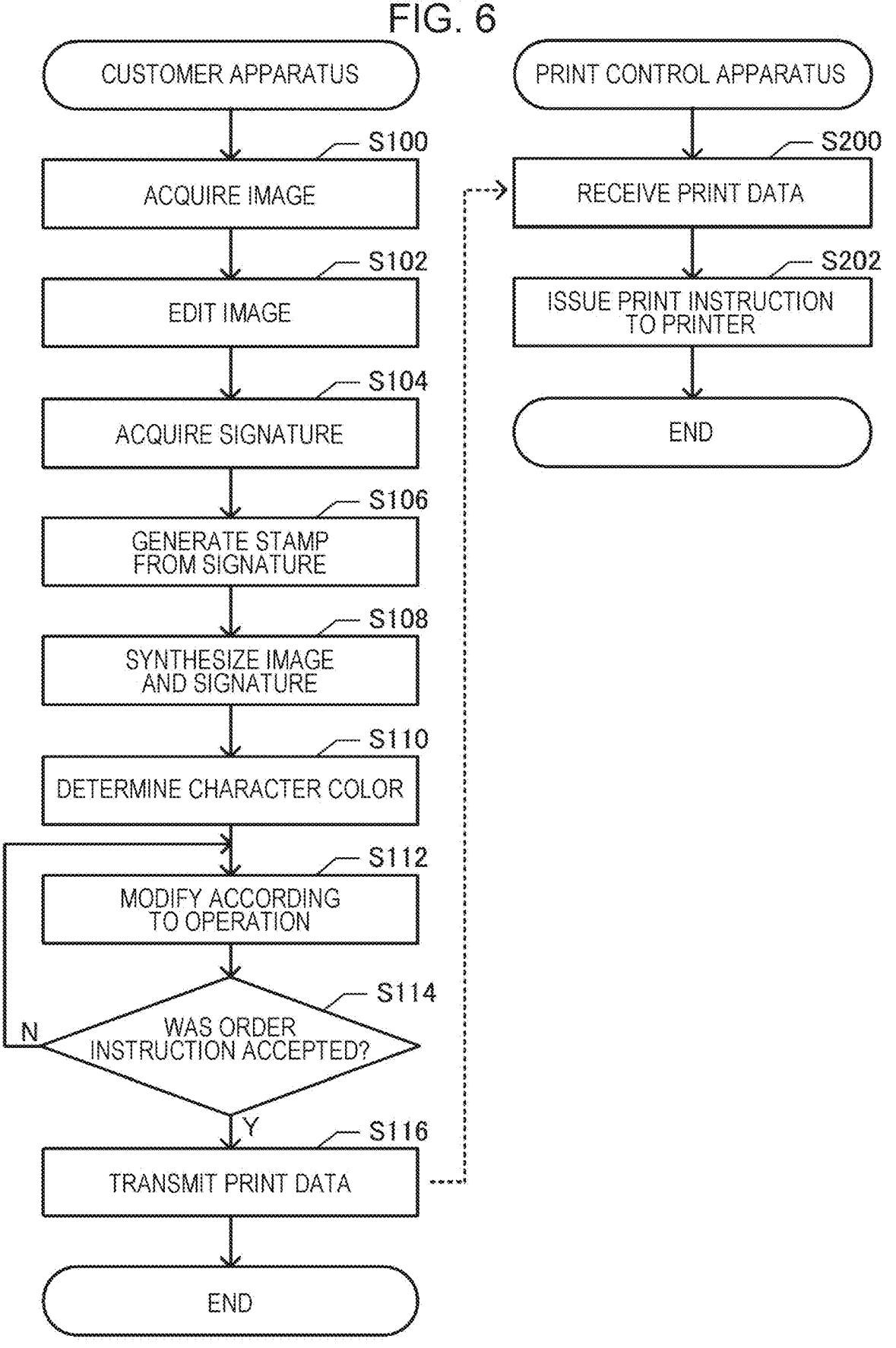
FIG. 6 is a flowchart illustrating a process of producing a printed matter.

FIG. 6 is a flowchart illustrating a process of producing a printed matter by the printed matter production system 1. The left side of FIG. 6 illustrates a flowchart of a process by the customer apparatus 10, and the right side of FIG. 6 illustrates a flowchart of a process by the print control apparatus 40. In addition, FIGS. 7 to 11 are diagrams illustrating screens displayed on the display 14 of the customer apparatus 10 in the process of producing a printed matter. The process of producing a printed matter is described below together with screen transition on the display 14.

First, the image acquiring section 112 of the customer apparatus 10 acquires an image to be printed (step S100). Next, the synthesizing section 114 edits the image according to an operation by a customer (step S102). When the operation is not performed by the customer, this processing is omitted.

Figure 7:
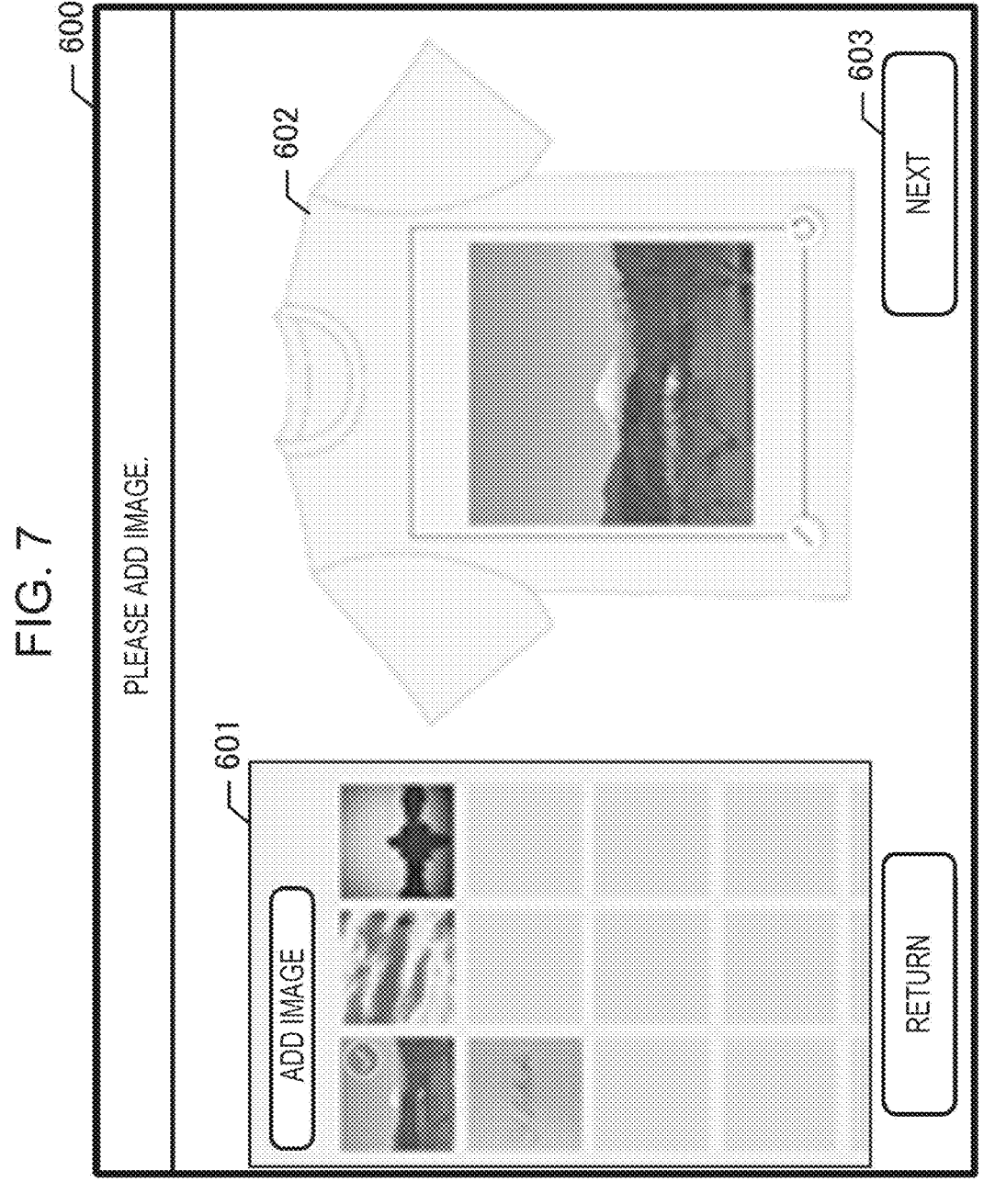
FIG. 7 is a diagram illustrating an example of display of an image selection screen.

As illustrated in FIG. 7, in the process of producing a printed matter, an image selection screen 600 is displayed on the display 14. On the image selection screen 600, an image display field 601 for an image as a candidate for an image to be printed and an image 602 of a medium are displayed. The image as the candidate for the image to be printed is, for example, an image transmitted from a device owned by the customer or the like. The present embodiment describes an example in which a T-shirt is selected as the medium. When a single image is selected by the customer, the selected image is superimposed and drawn on an image of the T-shirt as the medium. Therefore, the customer can imagine the T-shirt with the image printed thereon.

After selecting the image, the customer presses a Next button 603. As a result, the image is determined and the image acquiring section 112 acquires the image selected by the customer as an image to be printed.

Figure 8:
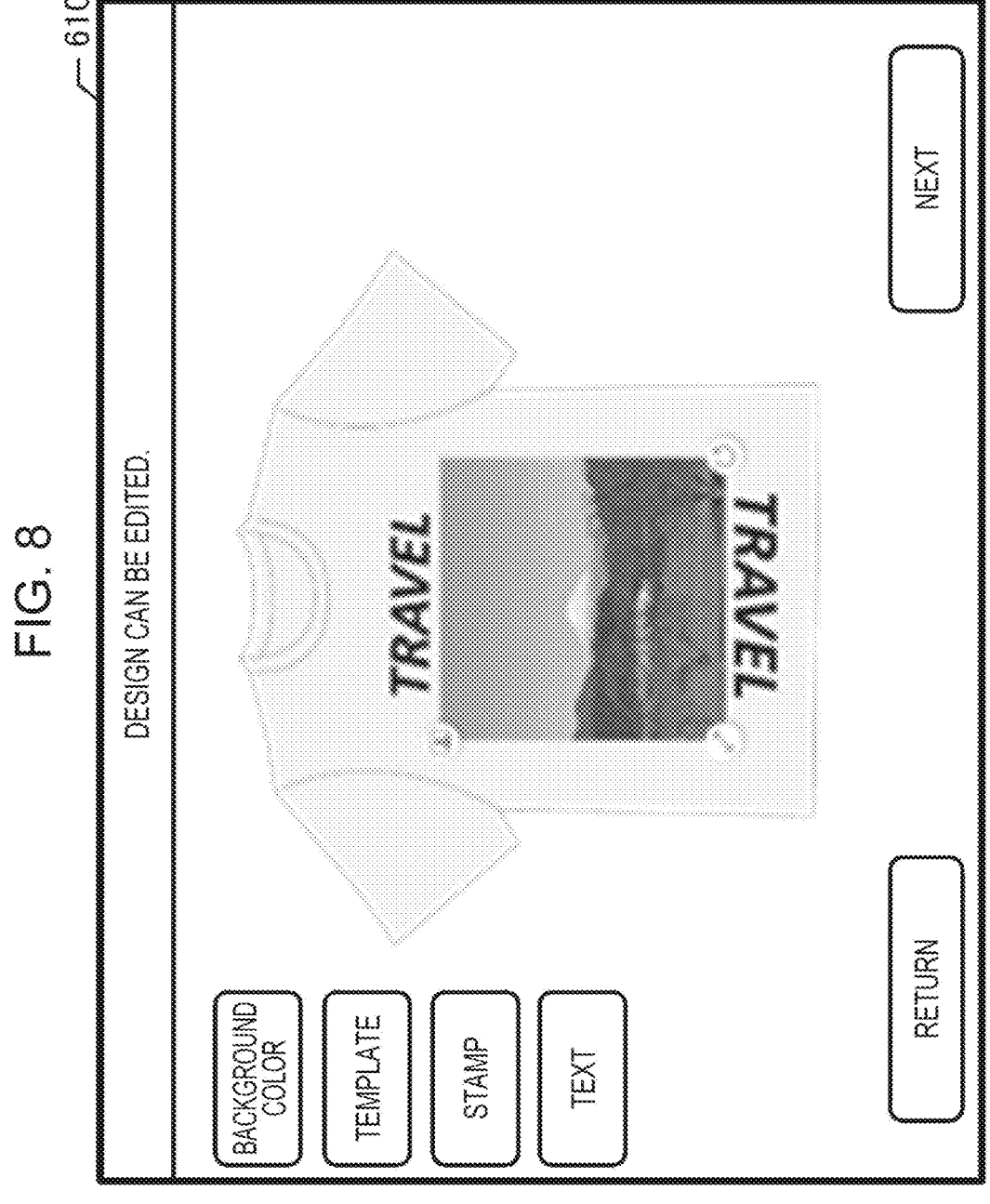
FIG. 8 is a diagram illustrating an example of display of a design edit screen.

In response to the pressing of the Next button 603, the displayed screen of the display 14 transitions to a design edit screen 610 illustrated in FIG. 8. The customer can operate the input unit 15 to make an edit by changing a color of a background, inserting a template image, a stamp, or a text, and the like on the design edit screen 610. The image is edited in step S102 on the design edit screen 610 according to an operation by the customer. FIG. 8 illustrates an example in which characters "TRAVEL" are inserted in upper and lower portions of the image according to an operation.

After the processing of step S102, the signature acquiring section 113 acquires a signature (step S104). Next, the synthesizing section 114 generates a stamp from the signature (step S106). For example, when a Stamp button 611 is selected on the design edit screen 610 illustrated in FIG. 8, a list of images as candidates for an image to be printed is displayed as in the image display field 601 of the image selection screen 600. When a handwritten signature is selected, the synthesizing section 114 generates a stamp from the selected signature.

Figure 9:
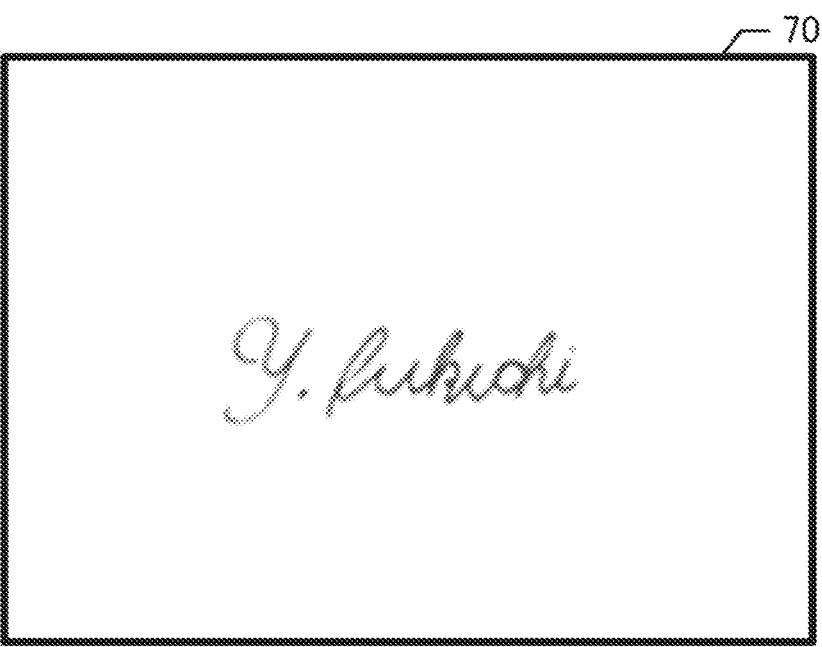
FIG. 9 is a diagram illustrating an example of a signature.

Specifically, the synthesizing section 114 performs optical character recognition/reader (OCR) on the signature to recognize characters of the signature and treats a region other than the characters as a transparent region. For example, when a handwritten signature 70 illustrated in FIG. 9 is selected, characters "Y. Fukuchi" are obtained by the OCR.

After the processing of step S106, the synthesizing section 114 synthesizes the image acquired in step S100 and the signature (step S108). Specifically, the synthesizing section 114 superimposes and arranges the stamp of the signature at a position corresponding to a writing direction of the signature on the image. In this case, the writing direction is a direction in which characters of the signature are arranged. Writing directions are a vertical writing direction and horizontal writing directions. The horizontal writing directions are a direction (reading direction) in which characters are arranged in order from the left to the right and a direction (reading direction) in which characters are arranged in order from the right to the left. For example, when the characters are arranged in the vertical writing direction, the synthesizing section 114 determines a lower left portion of the image as an arrangement position of the signature. When the characters are arranged in order from the left to the right in the horizontal writing direction, the synthesizing section 114 determines an upper right portion of the image as an arrangement position of the signature. When the characters are arranged in order from the right to the left in the horizontal writing direction, the synthesizing section 114 determines an upper left portion of the image as an arrangement position of the signature. Relationships between the writing directions and the arrangement positions of the characters may be set in advance by an administrator or the like. The relationships between the writing directions and the arrangement directions of the characters are not limited to the present embodiment.

Figure 10:
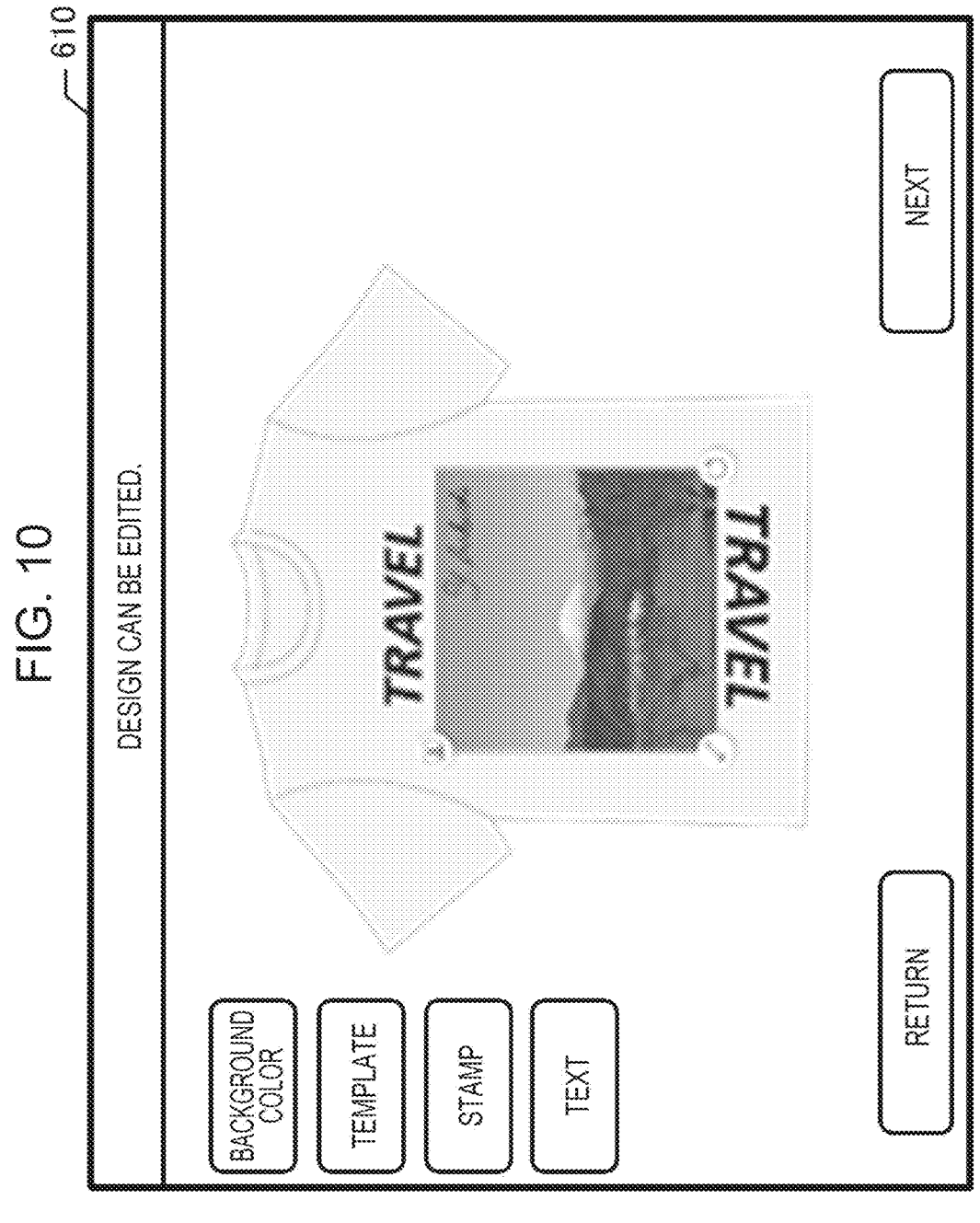
FIG. 10 is a diagram illustrating an example of synthesis of an image and a signature.

In the example illustrated in FIG. 10, the signature with the characters arranged in order from the left to the right in the horizontal writing direction is arranged on the upper right portion of the image. As described above, the synthesizing section 114 can automatically determine the arrangement position of the signature on the image according to the writing direction of the signature. Therefore, the customer does not need to specify the arrangement position of the signature.

After the processing of step S108, the synthesizing section 114 determines a color (character color) of the signature according to a color (color of a background) at the position where the signature is arranged on the image (step S110). The synthesizing section 114 determines a color enabling the signature to be visually recognized as the color of the signature. For example, when the background is white, the synthesizing section 114 determines black as the color of the signature. When the background is black, the synthesizing section 114 determines white as the color of the signature. By performing the above-described process, a signature image obtained by synthesizing the image and the signature is produced.

Next, the synthesizing section 114 modifies the arrangement position, the color, and a character type of the characters of the signature according to an operation from the customer (step S112). The modification of the character type is described below. A plurality of character types are set in the customer apparatus 10 in advance. When a single character type is selected by the customer, the signature is modified to the selected character type. When an operation is not performed, the processing of step S112 is omitted. Next, the processor 11 checks whether or not an order instruction was accepted according to an operation from the customer (step S114). When the order instruction was not accepted (N in step S114), the processor 11 causes the process to proceed to step S112. When the order instruction was accepted (Y in step S114), the processor 11 generates print data corresponding to the signature image obtained by synthesizing the image and the signature and transmits the print data, an order ID, and a print setting to the staff apparatus 20 (step S116). Then, the process by the customer apparatus 10 ends. The print data, the order ID, and the print setting are transmitted from the staff apparatus 20 to the server apparatus 30 and further transmitted from the server apparatus 30 to the print control apparatus 40.

After the print data, the order ID, and the print setting are transmitted by the customer apparatus 10, the processor 41 of the print control apparatus 40 receives the print data, the order image, and the print setting transmitted from the customer apparatus 10 via the staff apparatus 20 and the server apparatus 30 (step S200). Next, the print processing section 411 issues a print instruction to the printer 50a or 50b according to the print data and the print setting so as to cause the printer 50a or 50b to perform printing according to the print data and produce a printed matter which is a T-shirt with the printed signature image obtained by synthesizing the image and the signature (step S202).

As described above, the printed matter production system can synthesize an image and a signature and print the image after the synthesis so as to obtain a signature image obtained by appropriately signing the image and a printed matter with the signature image printed thereon. In addition, since the printed matter production system can synthesize a handwritten signature and an image, the printed matter production system can obtain a signature image with originality and produce a printed matter with the signature image printed thereon.

(3) Supplementary Notes

The embodiment described above is an example of the present disclosure and various other embodiments can be adopted. For example, the configuration of the printed matter production system including the apparatuses described above is not limited to the configuration illustrated in FIG. 1.

As a first modification, the number of apparatuses forming the printed matter production system is not limited to the embodiment. For example, the customer apparatus 10 and the staff apparatus 20 may be integrally formed. In addition, the server apparatus 30 and the print control apparatus 40 may be integrally formed. Furthermore, the server apparatus 30 may be a cloud server. In addition, the customer apparatus 10 and the print control apparatus 40 may be integrally formed as a single apparatus. In this case, the single apparatus includes the accepting section 111, the image acquiring section 112, the signature acquiring section 113, the synthesizing section 114, and the display processing section 115 of the customer apparatus 10, and the print processing section 411 of the print control apparatus 40. These sections 111 to 115 and 411, which are functions, are implemented by executing a printed matter production program for producing a printed matter.

As a second modification, the synthesizing section 114 of the customer apparatus 10 synthesizes a signature and an image according to a synthesis method based on either one or both of the image and the signature, and specific processing for the synthesis is not limited to the embodiment. It is preferable that the synthesizing section 114 synthesize a signature and an image according to a synthesis method based on a writing direction of the signature. For example, the synthesizing section 114 may change a character type of a signature to a character type according to a writing direction of the signature and synthesize the signature after the change and an image. For example, when a writing direction of a signature is a vertical writing direction, the synthesizing section 114 may change a character type of the signature to calligraphy. When a writing direction of a signature is a horizontal writing direction, the synthesizing section 114 may change a character type of the signature to gothic. In addition, when a color of an image where a signature is arranged and a color of the signature are similar, edging may be performed on the signature, and the image and the signature after the edging may be synthesized.

In addition, the synthesizing section 114 may arrange a signature at a position according to an image. For example, the synthesizing section 114 may arrange a signature in a region included in the image and has little color variation. Furthermore, the synthesizing section 114 may arrange a signature at a position according to both a writing direction of the signature and an image. For example, when a writing direction of a signature is a vertical writing direction, the synthesizing section 114 may determine, as an arrangement position of the signature, a region with little color variation among regions close to left and right sides of a rectangular image. In addition, when a writing direction of a signature is a horizontal writing direction, the synthesizing section 114 may determine, as an arrangement position of the signature, a region with little color variation among regions close to upper and lower sides of a rectangular image.

In addition, the synthesizing section 114 may produce a signature image by synthesizing a signature and an image according to a synthesis method based on a result of machine learning. In the machine learning, an image and a signature that were used for production of an actual printed matter by the same customer in the past, and a signature image obtained by synthesizing the image and the signature and used for the production of the actual printed matter by the same customer in the past are used as teacher data. By using a trained model obtained in the above-described manner, it is possible to obtain a signature image by synthesizing an image and a signature according to a synthesis method reflecting the past performance and preferred by the customer. When a customer uses the machine learning to produce a printed matter for the first time, an image and a signature that were used for production of an actual printed matter by another customer in the past, and a signature image obtained by synthesizing the image and the signature and used for the production of the actual printed matter by the other customer in the past may be used as teacher data.

As a third modification, when a direction from top to bottom of a signature is not clear for OCR for signatures, the synthesizing section 114 identifies, as the direction from top to bottom of the signature, a direction in which characters of the signature are recognized by the OCR at a highest rate, and uses a result of recognizing the characters in this case.

Figure 11:
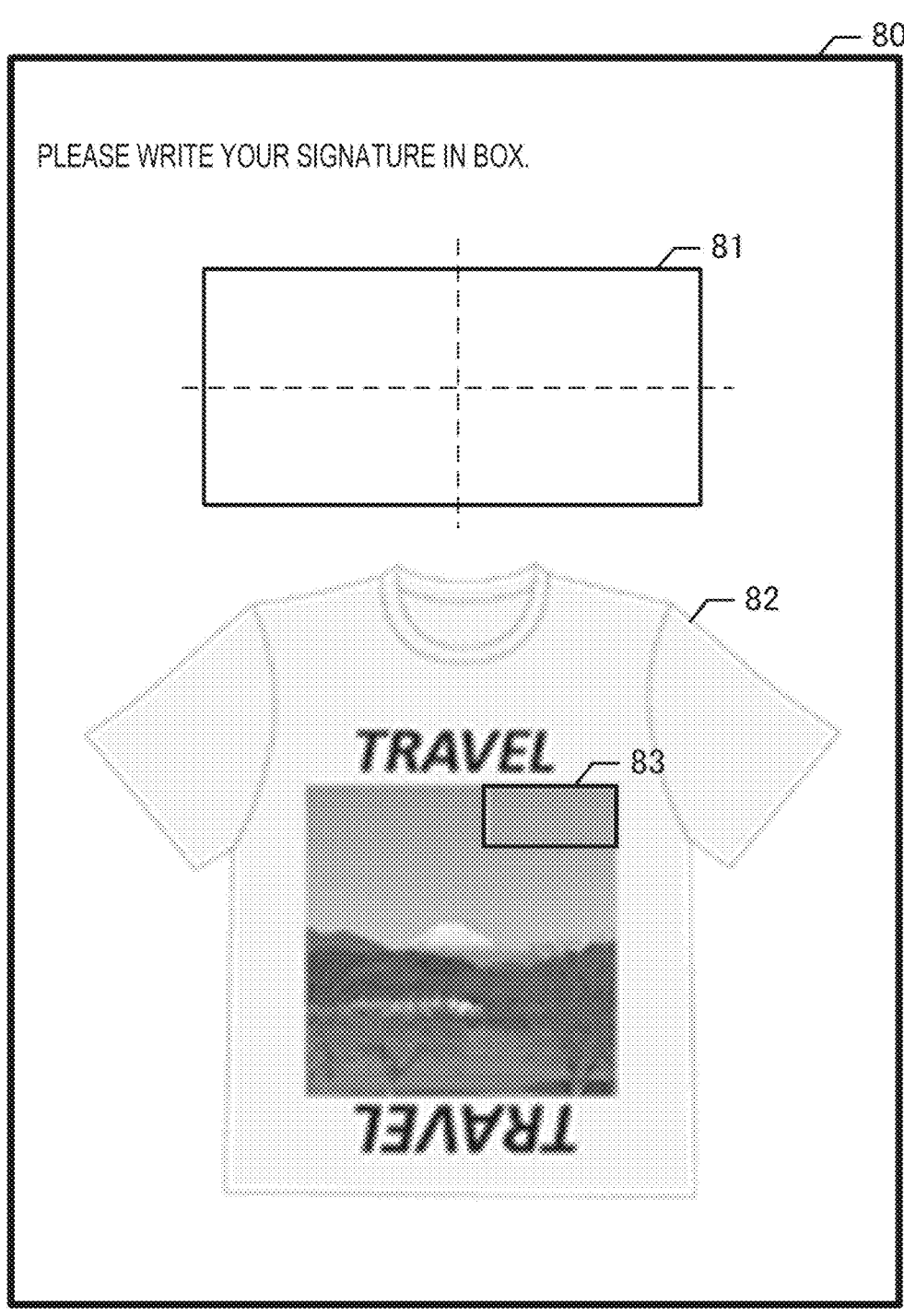
FIG. 11 is a diagram illustrating an order form according to a modification.

As a fourth modification, a signature may be acquired by any method. A signature may be written on paper by a customer in the shop, and an image of the signature may be captured into the customer apparatus 10 using a scanner or a camera. For example, when the customer selects an image on the display 14 of the customer apparatus 10 and specifies an arrangement position of a signature, such an order form 80 as illustrated in FIG. 11 is output from the printer 51. The order form 80 indicates a T-shirt 82 and an arrangement position 83 of the signature specified by the customer. In addition, in an upper part of the order form 80, a signature entry field 81 is provided. The order form 80 is an example of paper. The customer writes a signature in the signature entry field 81 by handwriting. Shop staff uses a scanner or a camera not illustrated to read the order form 80, and the customer apparatus 10 acquires the signature by distinguishing between the signature and a background and extracting the signature. The signature is displayed on the display 14. Therefore, the customer and the shop staff can check the signature. Alternatively, the customer may write a signature on the touch panel or the like included in the input unit 15 or the touch panel or the like included in the input unit 25 in the shop, and the signature acquiring section may acquire the signature and the stroke order of the signature. In this case, a direction from top to bottom of the signature and the writing direction of the signature may be determined based on the actual stroke order of the signature written by the customer.

The present disclosure is not limited to the embodiments. For example, various modifications and changes can be made without departing from the gist of the present disclosure by applying a modification of a certain embodiment to another embodiment, combining a certain modification with another modification, and the like.

The present disclosure can be applied as the programs and the methods to be executed by a computer. In addition, the system, the programs, and the methods described above may be implemented by a single apparatus or may be implemented using components included in a plurality of apparatuses, each component may be disposed in an apparatus different from the apparatuses described above, and the system, the programs, and the methods described above may include the various synthesis methods. In addition, changes can be made such that some parts may be software and some parts are hardware. Furthermore, the present disclosure can also be applied as a recording medium storing a program for controlling the system. The recording medium storing the program may be a magnetic recording medium or a semi-conductor memory, and recording media that will be developed in the future can be considered in exactly the same manner as the recording medium storing the program.

What is claimed is:

1. A printed matter production system comprising:
an image acquiring section that acquires an image;
a signature acquiring section that acquires a handwritten signature;
a synthesizing section that synthesizes the signature and the image by determining whether a writing direction of the signature is horizontal or vertical and by automatically arranging the signature on the image at a predetermined one of different positions of the image depending on determination result as to whether the writing direction of the signature is horizontal or vertical; and
a printing section that prints the image after the synthesis so as to produce a printed matter.

2. The printed matter production system according to claim 1, wherein
the synthesizing section changes a character type of the signature to a character type according to the writing direction and synthesizes the signature after the change and the image.

3. The printed matter production system according to claim 1, wherein
the synthesizing section arranges the signature at a position according to the image.

4. The printed matter production system according to claim 1, wherein
the synthesizing section synthesizes the signature and the image according to a synthesis method based on a result of machine learning.

5. The printed matter production system according to claim 4, wherein
the machine learning is learning in which the image, the signature, and a synthesized image obtained by synthesizing the image and the signature specified by a user are used as teacher data.

6. The printed matter production system according to claim 1, wherein
the synthesizing section determines a color of the signature according to a color of the image at a predetermined position on which the signature is arranged.

7. A non-transitory computer-readable storage medium storing a signature image production program for causing a computer to function as:
an image acquiring section that acquires an image;
a signature acquiring section that acquires a handwritten signature; and
a synthesizing section that synthesizes the signature and the image by determining whether a writing direction of the signature is horizontal or vertical and by automatically arranging the signature on the image at a predetermined one of different positions of the image depending on determination result as to whether the writing direction of the signature is horizontal or vertical so as to produce a signature image.

* * * * *